(No Model.) 5 Sheets—Sheet 3.
J. F. McLAUGHLIN.
PROCESS OF ASSEMBLING SECONDARY BATTERY ELECTRODES.
No. 429,049. Patented May 27, 1890.
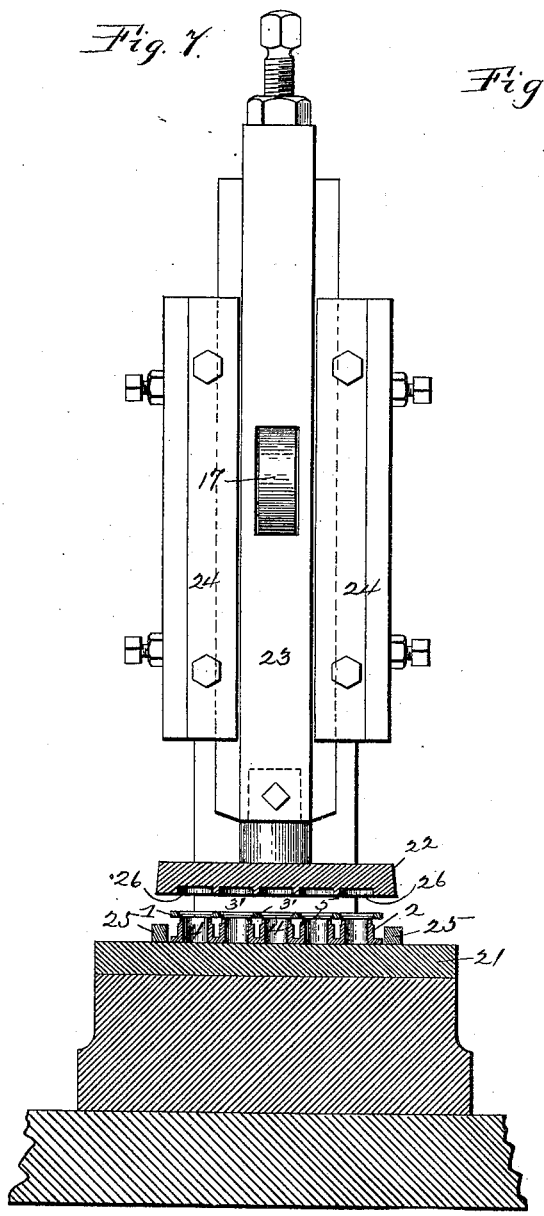
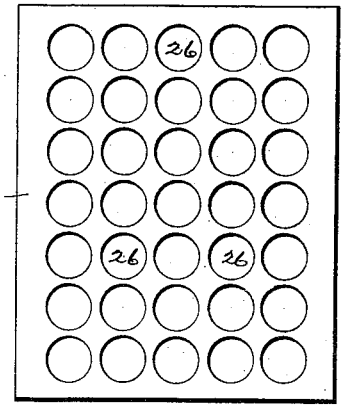
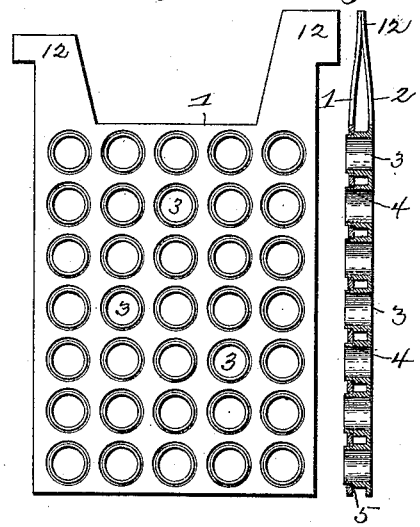
WITNESSES:
INVENTOR
James F. McLaughlin,
By Joseph Lyons
Attorney

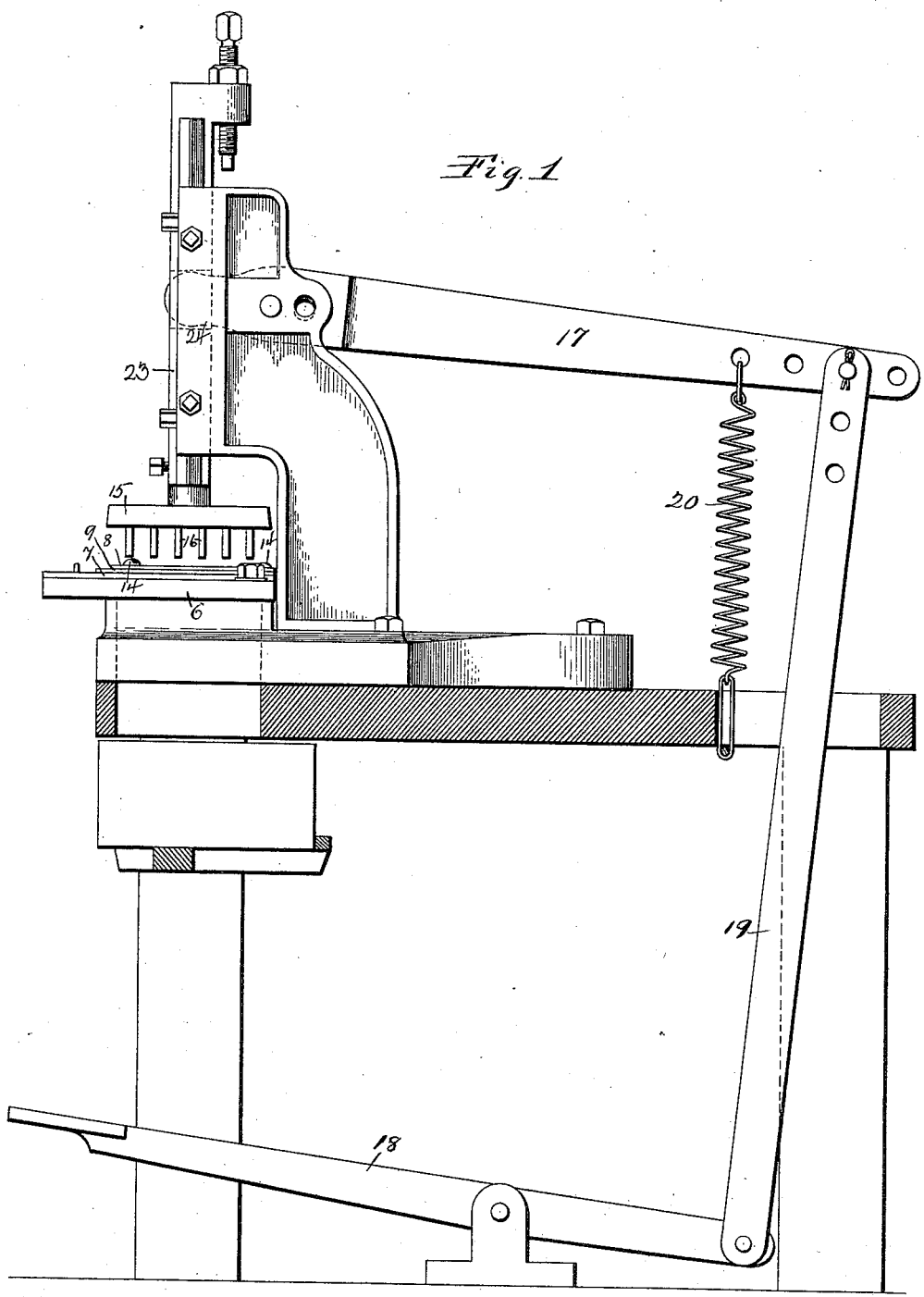

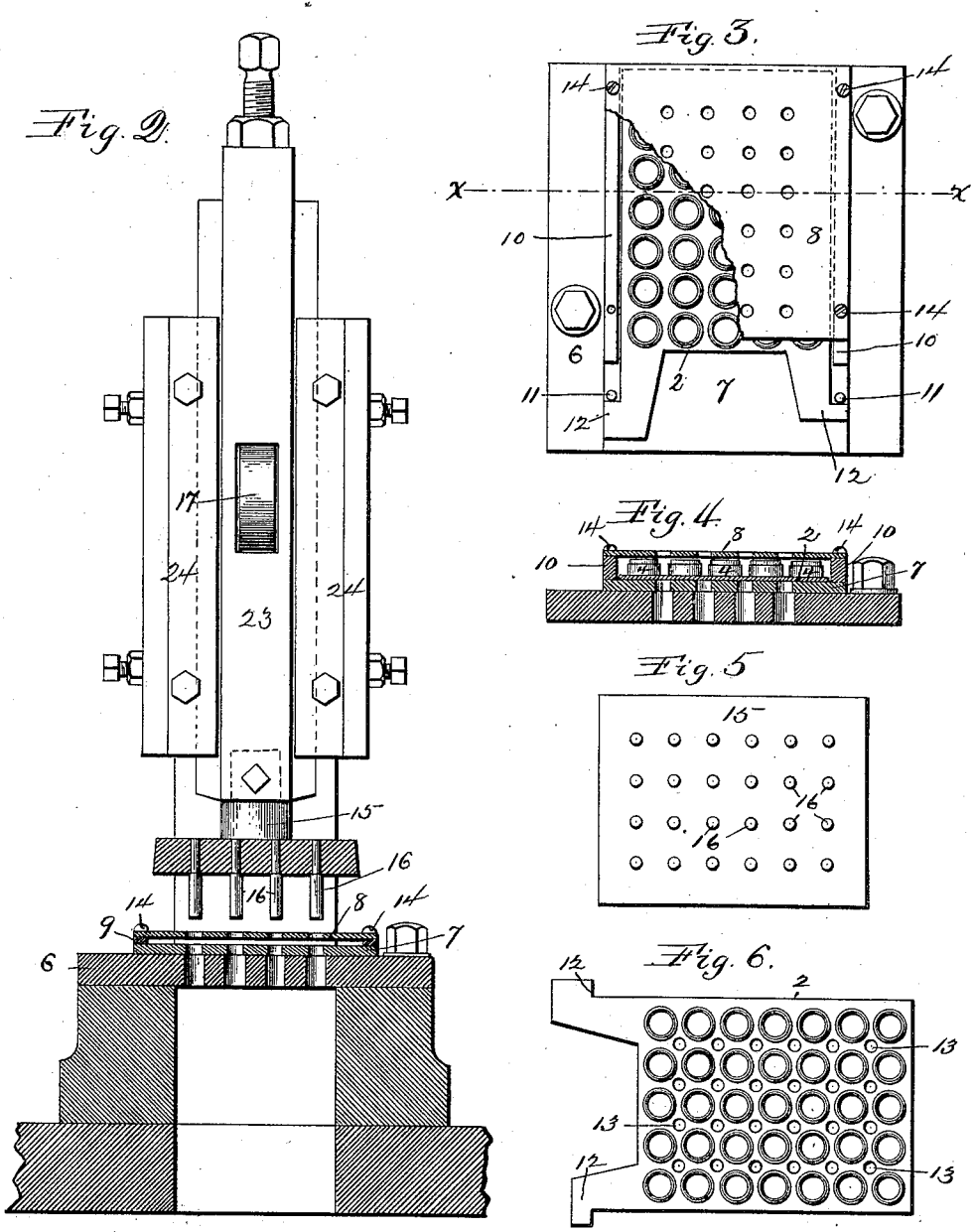

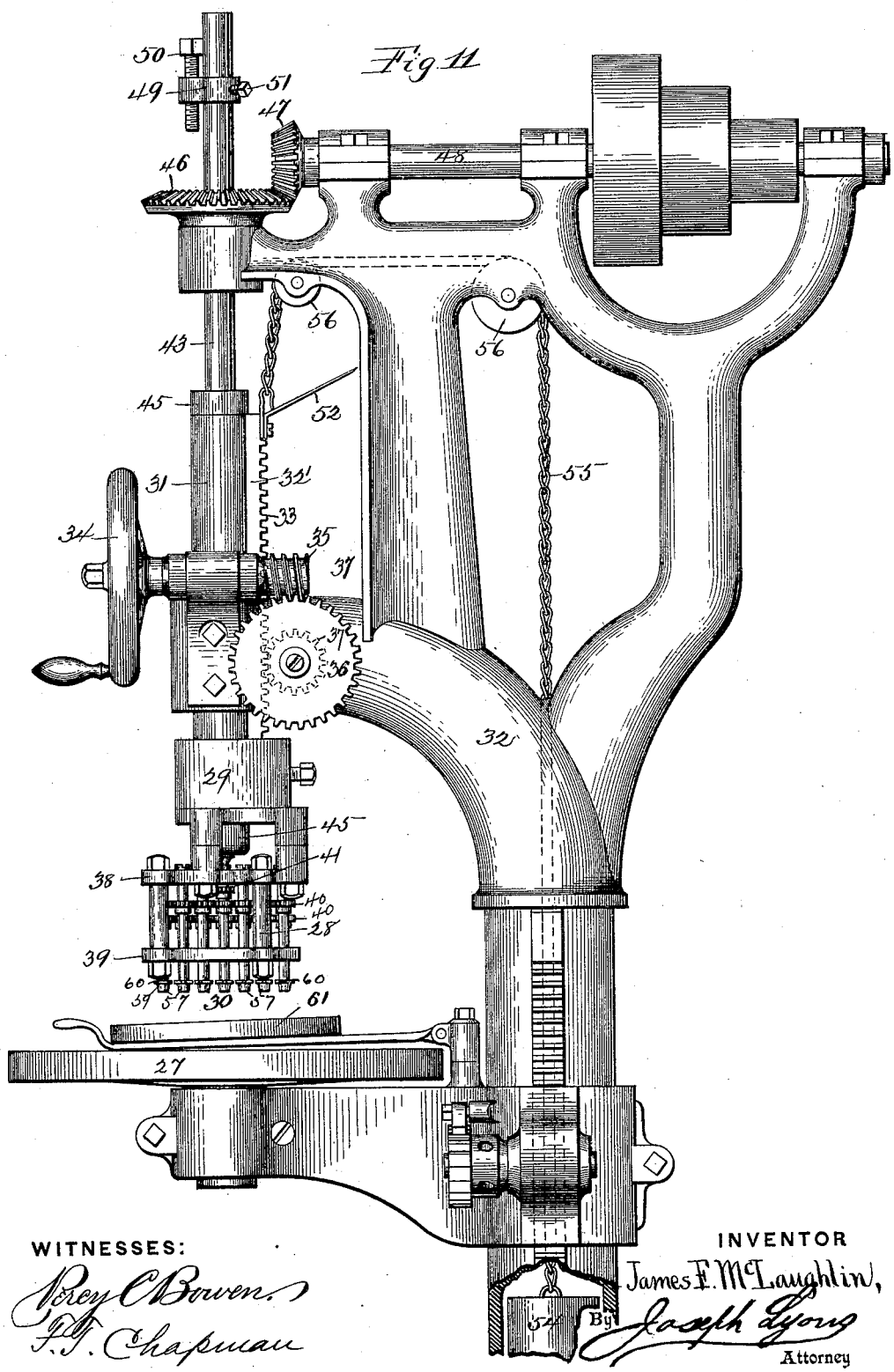

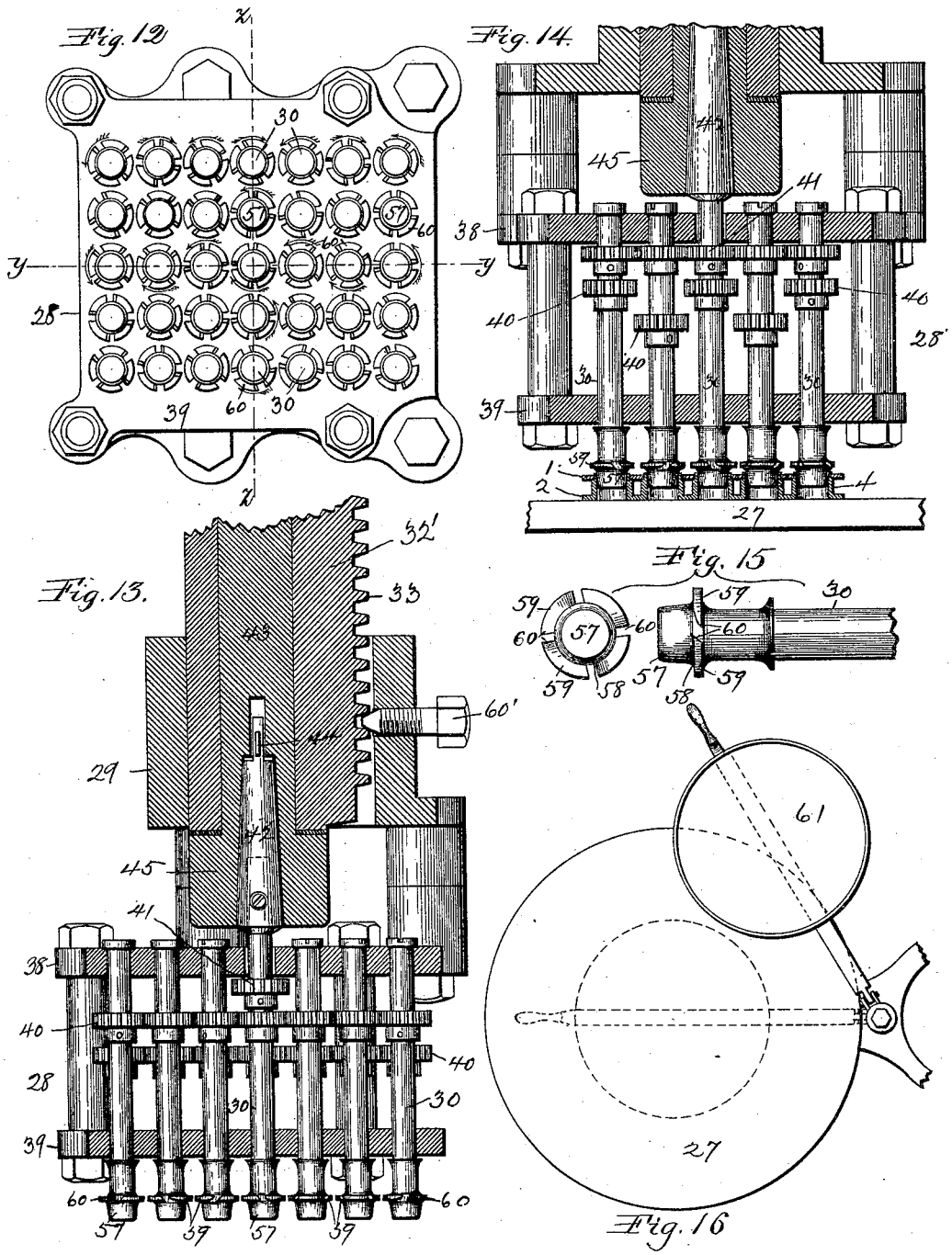

UNITED STATES PATENT OFFICE.

JAMES F. McLAUGHLIN, OF PHILADELPHIA, PENNSYLVANIA.

PROCESS OF ASSEMBLING SECONDARY-BATTERY ELECTRODES.

SPECIFICATION forming part of Letters Patent No. 429,049, dated May 27, 1890.

Application filed December 19, 1889. Serial No. 334,261. (No model.)

*To all whom it may concern:*

Be it known that I, JAMES F. MCLAUGHLIN, a citizen of the United States, and a resident of Philadelphia, in the county of Philadelphia and State of Pennsylvania, have invented certain new and useful Improvements in the Process of Assembling Secondary-Battery Electrodes, of which the following is a specification.

This invention is directed to a process of assembling and firmly uniting the two plates constituting together the electrode of a secondary battery, substantially like that described in my Letters Patent No. 408,666, dated August 6, 1889; and the invention consists in a series of steps whereby a perforated metallic plate is first pressed against a counter-plate having a series of shouldered flanges until the said flanges project therethrough and the perforated plates rest on the shoulders of the flanges, and then the flanges are by suitable means expanded against the walls of the perforations and partly upset and any projecting inequalities planed or chiseled off; and the invention further consists in certain other features, to be hereinafter pointed out, and covered in the claims.

For the sake of clearly explaining my invention, reference is had to the accompanying drawings, in which—

Figure 1 represents a side elevation, partly in section, of a perforator for carrying out one step of my invention; Fig. 2, a front elevation of the same, partly in transverse vertical section; Fig. 3, a plan of the bed or anvil of the same, showing the plate-holder in position; Fig. 4, a vertical transverse section on line $x$ $x$, Fig. 3; Fig. 5, an inverted plan of the cutter-head of the perforating-machine; Fig. 6, a plan of a flanged electrode-plate after it has been acted on by the perforator. Fig. 7 shows a front elevation, partly in section, of the machine for assembling the two plates; Fig. 8, a bottom plan of the assembling head or hammer of the same upon an enlarged scale. Figs. 9 and 10 show a plan and longitudinal vertical section, respectively, of the two plates assembled; Fig. 11, a side elevation of a combined riveting and finishing machine for carrying out the final steps of my process; Fig. 12, a bottom plan of the riveting and finishing head; Fig. 13, an enlarged vertical section of the riveting and finishing head and adjacent parts; Fig. 14, a similar view showing the parts in operation; and Figs. 15 and 16, detail views of the said riveting and finishing machine.

As shown in Figs 9 and 10, the plates 1 and 2 to be assembled and riveted together to form the electrode consist each of an apron having perforations 3, arranged in tiers and rows; but the plate 2 differs from the plate 1, which is a plain perforated plate, whose perforations are shouldered at 3', as shown most plainly in Fig. 7, in having its perforations surrounded by circular flanges 4, shouldered and reduced at the top, so that the latter may be readily slipped over the flanges 4 to rest on the shoulders 5 of plate 2, as shown. The two plates 1 and 2, with the shoulder and flanged perforations, respectively, may be cast in molds of the required shape in a manner well understood, and as such process forms no part of the present invention no illustration or description thereof is deemed necessary.

I begin my process by perforating my plates severally between the main perforations, so that when active material is confined between the plates, as described in my Letters Patent No. 410,007, August 27, 1889, the electrolyte shall have free access thereto. These intermediate perforations are made by the perforator illustrated in Figs. 1 to 5. This differs little from the well-known types of perforating-machines, and consists, essentially, of a bed or anvil 6, having mounted on it the die-plate 7 and the stripper-plate 8, separated by the blocks or guide-bars 9, as in Fig. 2, or 10, as in Figs. 3 and 4, according as the plate 1 or 2 is to be operated upon. It will be noted that the lower or die plate 7 is provided with stop-pins 11, against which the ears 12 on the plates 1 and 2 abut, and which, in conjunction with the guides 10, enable the said plates to be placed into accurate position, so that the perforations 13 shall be properly located. The die and stripper plates and the guide-bars are secured to the anvil by the screws 14 or by any suitable means, so as to be readily separable for the purpose of interchangeable use in connection with plates 1 and 2. The reciprocating punch-head 15, carrying the punches 16, acts in conjunction with the die and stripper in a manner well known and easily understood—to wit, the plate 1 or 2 is slid into the space between the die 7 and stripper 8, and the punch-head 15 is then depressed to perforate such plate with the small perforations 13 by means of the lever 17, actuated by treadle 18, through the pitman 19 and against the stress of spring 20. The plates are thus perforated, as shown in Fig. 6.

The plates are now ready to be assembled by the apparatus shown in Figs. 7 and 8 of the drawings. This apparatus consists, essentially, of the anvil 21 and the plunger 22, carried by the reciprocating plunger-rod 23, working in the guides 24. The anvil, it will be observed, is provided with the guides 25, for determining the exact position to be occupied by the plates to be assembled, and the plunger 22 is provided at its bottom with the circular recesses 26, large enough to receive the reduced heads of the flanges 4 when they protrude through the perforations 3 of the plate 1 in the operation of this apparatus to be now described. Plates 1 and 2 are placed one above the other, with the perforations 3 of the former in register with the reduced ends of the flanges 4 of the plate 2 and with the shoulders 3' facing upward, as shown. The two plates are then placed on the anvil with the apron of plate 2 downward and in the position determined by the guides 25. The plunger 22 is now caused to descend and forces the plate downward (the perforations 3 encircling the reduced ends of flanges 4) until the bottoms of the perforations 3 rest on the shoulders of the flanges. The flanges 4 are allowed to be protruded through these perforations by the recesses 26. The plates are now in relative position indicated in Fig. 10.

To finish the operation—i. e., to rivet the plates together and give them a finished appearance—the machine represented in Figs. 11 to 16 is employed. This machine consists, mainly, of an anvil 27 and a combined riveting and finishing head 28, consisting of a boss 29 and a gang of synchronously-revolving tools 30, carried thereby. The boss 29 is secured to a follower 31, adapted to slide up and down in the fixed frame 32, and secured therein against rotation by a rack-bar 32', having teeth 33, whose purpose is to act in conjunction with other parts, now to be described, to raise and lower the finishing-head. A hand-wheel 34, journaled in the frame, carries at its inner end a worm 35, meshing with a worm-wheel 36, mounted on the same shaft with the pinion 37, which meshes with the teeth 33 of the rack-bar 32'. By this means, it will be seen, the operator may cause the finishing-head 28 to descend gradually as the finishing operation progresses. A reverse motion of the hand-wheel returns the head to its starting-point.

The riveting and finishing tools are actuated to turn synchronously by the following mechanism: It will be noted that these tools are journaled in the plates 38 and 39, forming part of the finishing-head, and they are all caused to turn synchronously, in the usual manner well known in drilling and similar machines, by a train of gears 40, deriving its motion from a gear 41, fixed to the central tool, whose shank extends up into and is secured by a screw or otherwise to a conical bushing 42, in turn secured to the vertical rotary shaft 43 by a key 44. This shaft 43 extends up through the follower 31, and is secured against longitudinal movement with respect to the same by collars 45 45. At its upper end it is keyed to a bevel-gear 46, resting and turning on an upper bracket of the frame, said gear 46 meshing with a gear 47, fixed to a horizontal shaft 48, which is revolved by any suitable means. The extent of downward motion of this shaft 43 is limited by the stop 49, doubly adjustable by means of screws 50 and 51. The progress of the downward movement of the finishing-head is indicated by the pointer 52, sliding in proximity to a scale (not shown) on the frame. A weight 54, attached to a chain 55, running over pulleys 56 56 and attached to the follower 31, takes up any undue strain and counteracts the weight of the finishing-head.

The particular form of riveting and finishing tools will best be understood from Fig. 15, which represents an elevation and a bottom view of one of these tools. It will be noted that the same is provided at its bottom with a conical head 57, terminating in a curved cone-shaped enlargement 58, and surmounted by a number of horizontal cutters 59, preferably in one piece with the cone 57, as shown, and arranged annularly and provided with the cutting-edges 60. The enlargement 58 may be omitted from the tools, although it serves to do the work more effectually, and is therefore preferred.

An oil or soap pan 61, arranged as shown, to be swung in and out of position for the purpose of dipping the tools therein for cooling, may form a part of the machine.

This machine carries out the last steps of my process, which are as follows: The secondary-battery plate, having assumed the shape illustrated in Fig. 10, is placed upon the anvil 27 of the finishing-machine with the flanges 4 up, as shown in Fig. 14. The finishing-head is now caused to descend, and its initial effect is to expand and force the flanges 4 outward and spin them against the inner walls of the perforations 3 in the plate 1 by virtue of the pressure exerted by the conical heads 57. A further spinning or riveting is done by the cone-shaped enlargement 58, whose function is first to upset the protruding parts of the flanges and then to force them into the shoulders at 3', and thus secure them to the plate 1. The finishing-head continues to descend, and finally brings the cutters 59 into engagement with the upset flanges, thereby cutting or planing away any unevenness or projections and finishing the electrode, which will now be ready for use. The boss 29 is adjustably secured to the follower 31 by the screw 60 entering into one or the other of the recesses between the teeth 33 of the rack 32'.

It is obvious that my process, consisting of the perforation, the assembling, the riveting together, and finishing steps, may be carried out by other devices than those described, and I do not herein claim any of the mechanism shown; but What I do claim, and desire to secure by Letters Patent, is—

1. The process of uniting a perforated and a flanged plate such as shown, assembled by causing the perforations of the former to surround the shouldered part of the flanges of the latter, which consists in forcing the flanges of the flanged plate outward and spinning them against the sides of the perforations of the perforated plate, all substantially as described.

2. The process of uniting a perforated and a flanged plate such as shown, assembled by causing the perforations of the former to encircle the flanges of the latter, which consists in first forcing the flanges outward and spinning them against the sides of the perforations, then upsetting and welding the upper protruding ends of the flanges to the perforated plate, all substantially as described.

3. The process of uniting a perforated and a flanged plate such as shown, and assembled to cause the flanges to protrude through the perforations, which consists in upsetting and uniting the protruding flanges of the flanged plate to the perforated plate, all substantially as described.

4. The process of uniting a perforated and a flanged plate such as shown, and assembled by causing the flanges of the flanged plate to protrude through the perforations, which consists in first forcing the flanges outward and uniting them with the sides of the perforations, then upsetting the protruding ends of the flanges and riveting them to the perforated plate, and then cutting away the projecting unevenness, all substantially as described.

5. The process of uniting a perforated and a flanged plate such as shown, which consists in first forcing the flanges of the flanged plate through the perforations to the required extent and then spinning and riveting said flanges to the perforated plate, all substantially as described.

6. The process of uniting a perforated and a flanged plate such as shown, which consists in first forcing the flanges of the flanged plate through the perforations of the perforated plate, and then spinning and riveting the flanges to the perforated plate, and finally cutting away any unevenness or projecting edges, all substantially as described.

7. The process of making electrode-plates for secondary batteries, which consists in first perforating a perforated plate, and a flanged plate between the perforations and the flanges, respectively, then assembling the two by forcing the flanges through the perforations, and finally uniting the flanges to the perforated plate, all substantially as described.

In testimony whereof I have signed my name to this specification in the presence of two subscribing witnesses.

JAMES F. McLAUGHLIN.

Witnesses:
EDWIN F. GLENN,
WM. W. KER.